Figure 1:
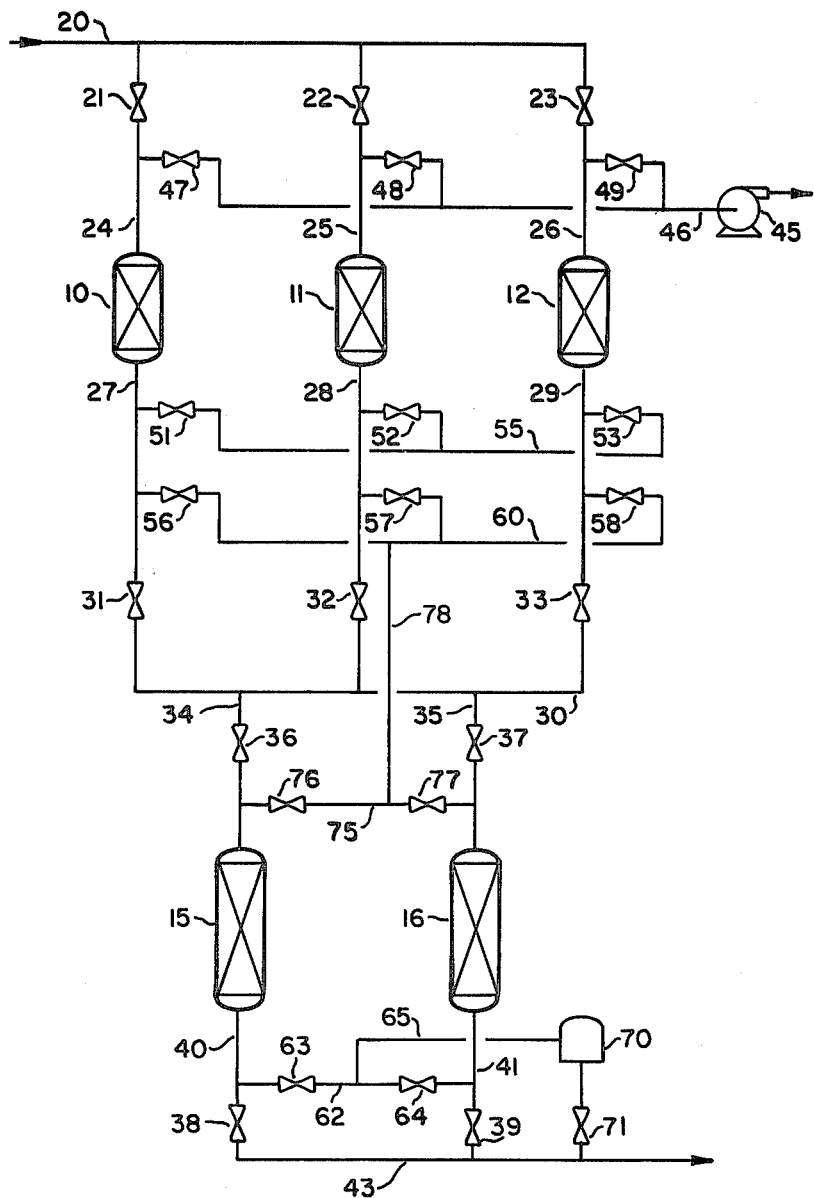

United States Patent [19]

Kumar et al.

[11] Patent Number: 4,477,265
[45] Date of Patent: Oct. 16, 1984

[54] ARGON PURIFICATION

[75] Inventors: Ravi Kumar, Allentown; Shivaji Sircar, Wescosville; Thomas R. White; Eugene J. Greskovich, both of Allentown, all of Pa.

[73] Assignee: Air Products and Chemicals, Inc., Allentown, Pa.

[21] Appl. No.: 405,643

[22] Filed: Aug. 5, 1982

[51] Int. Cl.³ .............................................. B01D 53/04
[52] U.S. Cl. ............................................ 55/26; 55/58; 55/62; 55/66
[58] Field of Search ................... 55/25, 26, 58, 62, 66

[56] References Cited

U.S. PATENT DOCUMENTS

| | | | |
|---|---|---|---|
| Re. 31,014 | 8/1982 | Sircar | 55/62 X |
| 2,810,454 | 10/1957 | Jones et al. | 55/66 |
| 2,893,512 | 7/1959 | Armond | 55/66 X |
| 3,242,645 | 3/1966 | De Montgareuil et al. | 55/58 |
| 3,928,004 | 12/1975 | Bligh et al. | 55/66 |
| 4,144,038 | 3/1979 | Armond | 55/58 |
| 4,190,424 | 2/1980 | Armond et al. | 55/58 |
| 4,239,509 | 12/1980 | Bligh et al. | 55/66 |
| 4,299,596 | 11/1981 | Benkmann | 55/62 X |

FOREIGN PATENT DOCUMENTS

| | | | |
|---|---|---|---|
| 2826913 | 1/1980 | Fed. Rep. of Germany | 55/66 |
| 61092 | 5/1979 | Japan | 55/66 |

Primary Examiner—Robert Spitzer
Attorney, Agent, or Firm—James C. Simmons; E. Eugene Innis; Thomas G. Ryder

[57] ABSTRACT

Argon is recovered from a gas stream comprising the same in admixture with oxygen and nitrogen, by a vacuum swing adsorption (VSA) process wherein the mixed gas is passed through an adsorbent bed having thermodynamic selectivity for adsorption of nitrogen and the unadsorbed portion then passed through a second adsorbent bed having kinetic selectivity for retaining oxygen. Both adsorbent beds are regenerated by vacuum desorption, applied to the first bed for a longer time period than that of the second bed. Further purification of the recovered argon may be carried out, if desired, by catalytic hydrogenation of residual oxygen therein. The mixed gas stream fed to the VSA unit may be that obtained from the crude argon column associated with a cryogenic air separation plant and the waste gas from the VSA unit may be recycled to the main column of the cryogenic air separation plant, thus enhancing argon recovery.

14 Claims, 2 Drawing Figures

ARGON PURIFICATION

TECHNICAL FIELD

The present invention pertains to purification of a crude argon stream by selective sorption of contained contaminants therefrom.

BACKGROUND OF THE PRIOR ART

Atmospheric air is composed of about 78% $N_2$, 21% $O_2$ and slightly less than 1% argon, the rest being made up of smaller amounts of other components, chiefly $CO_2$ (about 0.03%).

In the operation of a cryogenic air separation plant, in addition to the recovery of separate product streams consisting essentially of oxygen and nitrogen respectively, there may be recovered a crude argon stream containing in the order of about 94% argon accompanied by about 5% oxygen and about 1% nitrogen.

To further purify such crude argon streams, particularly for removal of the contained oxygen, one of the methods generally employed is to react the oxygen with hydrogen. Large quantities of hydrogen are required for the desired purification, which renders this process costly and is largely obsolete in those parts of the world where hydrogen availability and shipment are limited.

Another method that has been used in the past to eliminate or reduce the need for hydrogen in the purification of argon, is by the use of 4A molecular sieves for cryogenic adsorption of oxygen from its admixtures with argon. This process presents the problem of quick cooling to cryogenic temperatures immediately following the high temperature desorption step. Slow cooling results in reduced capacity of the sieve. One such process employing 4A molecular sieve is described in U.S. Pat. No. 3,242,645, which discloses treatment of a gas stream predominating in oxygen and containing from about 5.5 to 10.5 volume percent argon, obtaining a gain in argon concentration of the argon-enriched fraction of from about 2 to about 10% (the latter at reduced product yields).

U.S. Pat. No. 4,144,038 discloses a process for increasing the proportion of a desired gas in a product stream from a charged gas mixture of such gas and at least two other constituents. The patented system comprises at least three adsorbent columns operated cyclically in parallel, each column containing as discrete layers therein a bed of adsorbent which selectively adsorbs oxygen (e.g. molecular sieve carbon) and a bed of adsorbent which selectively adsorbs nitrogen (zeolite). The described system is stated to be useful in separation of constituents of atmospheric air by passing the air feedstock first through the zeolite bed for selective adsorption of nitrogen therefrom and obtaining an oxygen-enriched effluent containing 95% oxygen and 5% argon. This effluent passes through the bed of molecular sieve carbon, which selectively adsorbs oxygen and yields an unadsorbed product effluent enriched in argon. The described system of the patent is stated to be operable for separation of argon from an oxygen-rich feedstock withdrawn from the rectification column of a cryogenic air separation plant. In such operation the feedstream is passed first through the bed of molecular sieve carbon for selective adsorption of oxygen and the unadsorbed effluent depleted in oxygen is passed through the zeolite layer of the column for selective adsorption of nitrogen therefrom. In each of the described process, regeneration of the column is effected by simultaneous vacuum desorption of both layers of adsorbent in the column. The example given in the patent of a feed stream derived from the rectification column of an air separation plant is one comprising 12% argon, 87% oxygen and 1% nitrogen. The purity of the recovered argon stream obtained by the patented process is not disclosed.

SUMMARY OF THE INVENTION

In accordance with the present invention argon of high purity is separated and recovered from a crude argon stream containing minor amounts of oxygen and nitrogen, by selective adsorption of these contaminants in a series of sorption beds. The process utilizes a cyclic scheme operating adiabatically around a base temperature of about 0° C. with a moderate swing in pressure levels which may be in the order of about one atmosphere.

In the preferred embodiment the system employed comprises two separate adsorbent columns in series, the first of which utilizes an adsorbent bed capable of preferentially adsorbing nitrogen from its admixture with argon and oxygen, by virtue of its thermodynamic selectively for nitrogen. The second column contains a molecular sieve adsorbent bed effective in preferentially sorbing oxygen from admixture with argon, due to its kinetic selectivity for oxygen. The regeneration of the nitrogen-adsorbing column and of the oxygen-adsorbing column after termination of the adsorption step, is effected by vacuum desorption and subsequent repressuring of each of these columns to the desired on-stream pressure level employed for operation of the adsorption step of the cycle. Thus, each of the nitrogen-adsorption columns and each of the oxygen-adsorption columns during a fixed cycle goes through the sequence of (1) adsorption, (2) evacuation and (3) repressurization. In the operation according to the present invention, however while the same portion of the total cycle time is devoted to the adsorption step in the nitrogen-adsorbing columns as in the oxygen-adsorbing columns, the evacuation and repressuring of the latter columns is effected in a significantly shorter period. Thus for continuous operation of a system employing a plurality of nitrogen-adsorbing columns operated sequentially in parallel and a plurality of oxygen-adsorbing columns in their own parallel arrangement, a lesser number of the latter may be advantageously employed for a given throughput of the feedgas mixture, while affording enhanced flexibility of the operation.

Figure 2:
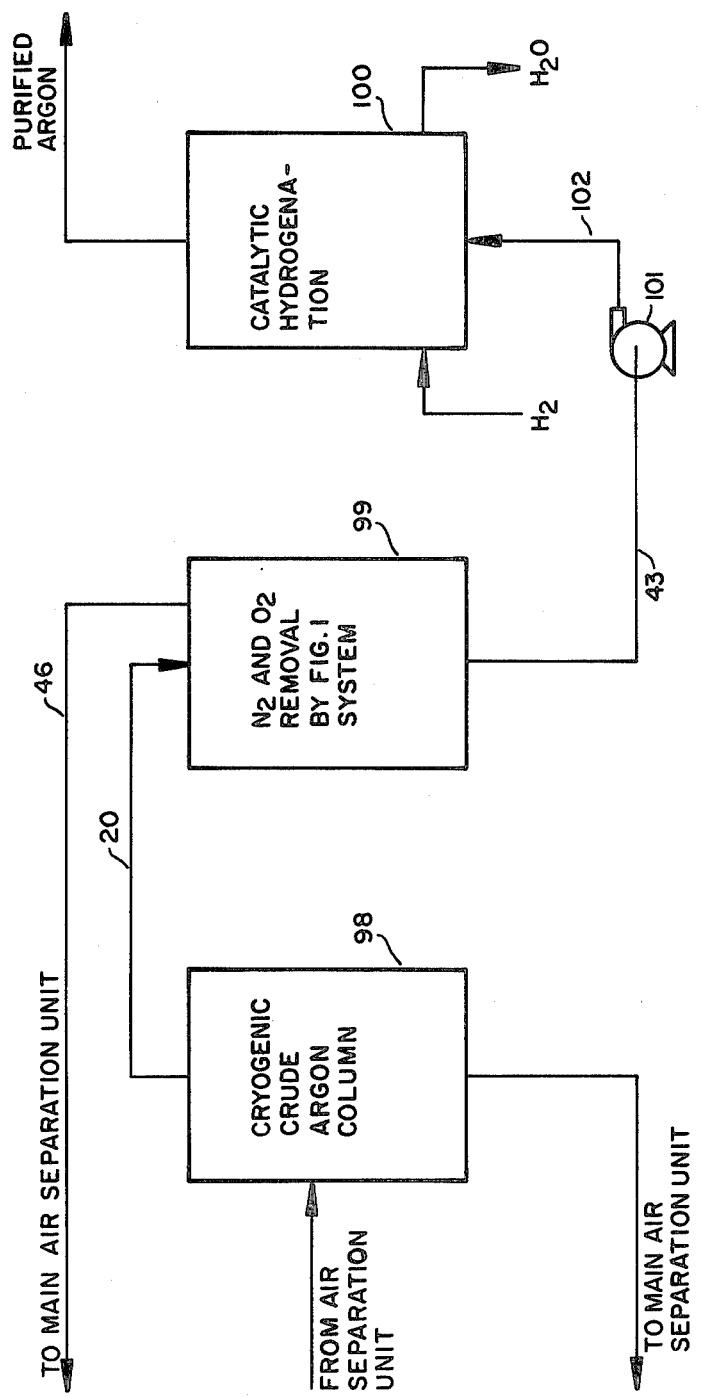

The operation of the invention will be understood and certain of its advantages appreciated from the detailed description which follows read in connection with the accompanying drawings, wherein FIG. 1 is a simplified schematic flow diagram of a system for practice of the invention;

FIG. 2 is a schematic flow diagram of a preferred arrangement showing the system in its association with an antecedent crude argon source and means for subsequent further purification of the recovered argon.

Referring now to FIG. 1 of the drawings, there is shown a group of first sorbent columns 10, 11, 12 operated in parallel and a group of second sorbent columns 15, 16 also operated in parallel. While, in the particular embodiment illustrated there are three first sorbent columns and two second sorbent columns, it will be understood that the number of columns needed in each group will depend upon the particular cycle time designed and the capacity of the sorbents employed. As is well known in the art, the use of several sorbent beds in parallel is to enable continuous operation of the system, so that while one or more beds are being operated to sorb contaminant from the influent gas stream, those not so engaged are being subjected to regeneration of adsorbent and preparation of the bed for further return to on-stream operation.

The initial feed of the crude argon stream is through a manifold 20 arranged to be selectively connected to the sorbent columns 10, 11, 12 respectively by means of valves 21, 22, 23 in lines 24, 25, 26 connected to the inlets of said columns. Each of the columns 10, 11, 12 is provided with a discharge conduit 27, 28, 29 respectively, at its end opposite the inlet, which conduits all connect to a common manifold 30 by means of valves, 31, 32, 33 provided in said conduits. Connected in flow communication with manifold 30 are conduits 34 and 35 which are respectively connected in flow communication to the inlet ends of columns 15 and 16 by opening valves 36, 37. The opposite ends of columns 15 and 16 respectively are connected to a discharge manifold 43 via valves 38, 39, in lines 40, 41 respectively.

Thus, by means of the elements so far described, the crude argon stream may be selectively introduced into the desired one of the columns 10, 11, 12 under control of its associated valve 21, 22, 23, passed through that column and discharged into one or the other of columns 15, 16 for further treatment therein. The treated stream from column 15 or 16 may then be withdrawn for discharge via manifold 43.

For purposes hereinafter explained, each of the lines 24, 25, 26 is connected to a vacuum pump 45, by means of line 46, into which lines 24, 25, 26 respectively connect through valves 47, 48, 49.

Conduits 27, 28, 29 also connect by valves 51, 52, 53 respectively to a common manifold 55 and by valves 56, 57, 58 to a common manifold 60.

Spanning lines 40 and 41 is a by-pass 62, which can be selectively placed in flow communication with line 40 by valve 63 and with line 41 by valve 64. Between valves 63 and 64 therein, line 65 connects to a storage vessel 70, which can be placed in flow communication with discharge conduit 43 by opening valve 71 connecting to the vessel.

Spanning lines 34 and 35 is a by-pass line 75 connected to 34 and 35 selectively by valves 76 and 77 respectively. A line 78 between said valves connects line 75 to line 60, for purposes hereinafter explained.

PROCESS STEPS FOR SECTION I COLUMNS

In operation of the system above described, each of the columns 10, 11, 12, comprising the nitrogen removal section (I), undergoes in cyclic sequence the following steps:

Step (A1): Adsorption, which consists of
(a) Flowing the feed stream of crude argon through the on-stream column packed with an adsorbent capable of selectively removing $N_2$ contained in the feed stream. This step is preferably carried out at near ambient pressure and at a moderate temperature in the order of about $-20°$ to $+30°$ C.
(b) During said adsorption withdrawing an effluent stream which is essentially freed of $N_2$ and feeding the effluent into a selected one of columns 15, 16 constituting the oxygen removing Section (II).
(c) Continuing steps A1(a) and A1(b) until the exit $N_2$ concentration at the discharge outlet from the on-stream Section I column reaches a preset maximum, preferably at the level of about 3 ppm. The sorbent in the on-stream column of Section I can now be considered "spent" because it has exhausted capacity for the desired $N_2$ separation.

Step (A2): Evacuation, which consists of
(a) Discontinuing the feed flow through the initial on-stream column of Section I and switching the feed to a companion column of that section.
(b) Evacuating the spent column in a direction opposite to that of the feed by connecting it with a Section II column which is then ready for the evacuation step. Simultaneous evacuation of the Section I and Section II columns is continued until the desired pressure level of the Section II column is reached. In preferred operation evacuation is continued until the pressure level in the Section II column is at a level of 20 to 300 torr, desirably at about 100 torr.
(c) At this time the Section II column is disconnected from flow communication with the Section I column and the Section I column alone is finally evacuated to about the selected low pressure level of the evacuated Section II column ($\sim 100$ torr).

Step (A3): Pressurization, which consists of:
(a) Connecting the freshly evacuated Section I column (after step A2(c)) with another Section I column then on stream (step A1(a)) and pressurizing the evacuated column to near ambient pressure using the $N_2$-depleted effluent from companion Section I column. During this pressurization the direction of gas flow into the column being pressurized is in a direction opposite to that of the adsorption step. When the Section I column has been brought to the designed pressure level for the adsorption a new cycle is started by repetition of steps A1 through A3.

PROCESS STEPS FOR SECTION II COLUMNS

The oxygen adsorption columns of Section 2 undergo the following steps in timed sequence.

Step (B1): Adsorption, which consists of:
(a) Flowing the nitrogen-free effluent gas from a Section I column at near ambient pressure through a column packed with an adsorbent capable of adsorbing oxygen at a faster rate than that of adsorbing argon from a mixture comprising these elemental gases, such as a carbon molecular sieve. This operation is preferably carried out at somewhat below normal room temperature, say at a temperature in the order of about $-30°$ to $+10°$ C.
(b) During the adsorption step there is discharged from the on-stream Section II column an effluent argon stream depleted of oxygen (less than 0.5% by volume $O_2$ and preferably less than 1000 ppm $O_2$).
(c) Step B1(a) and B1(b) are continued until the oxygen concentration in the effluent gas reaches the desired fixed maximum level, at which time the adsorbent bed is considered "spent" and ready for regeneration, by the steps below.

Step (B2): Evacuation, which comprises:
(a) discontinuing flow of the feed gas from a Section I column into the Section II column and transferring the feed to a companion Section II column which has been repressured to the designed on-stream pressure level.
(b) Evacuating the "spent" Section II column in a direction opposite to that of step (1) by connecting that column to a Section I column then undergoing its evacuation (step A2(b)). The evacuation is continued until the pressure level in the Section II column reaches the desired subatmospheric level, in the order of about 20 to 300 torr, preferably at about 100 torr, at which time the previous flow connection between the Section I and Section II column under evacuation is discontinued, while continuing further evacuation of the Section I vessel alone.

Step (B3): Pressurization, which comprises:

(a) Connecting the freshly evacuated Section II column with another Section II column which is then on stream (step B1(a)) and thereby pressurizing the evacuated column with oxygen-depleted gas to near ambient pressure with the argon rich effluent of the companion Section II column. The direction of gas flow into the column being pressurized is opposite to that employed in step B1(a).

The Section II column is now ready to undergo a new cycle starting with step B1(a).

The step sequence between the number of columns in Section I and the number of columns in Section II are so arranged that the introduction of the crude argon feed, the withdrawal of the purified argon stream and the operation of the vacuum pump are continuous.

A typical operation in the preferred practice of the invention for the purification of a crude argon feed gas predominating in argon and containing minor amounts of oxygen and nitrogen will now be described, assuming the system employs three Section I columns each selectively connectible to one or the other two Section II columns.

EXAMPLE 1

The crude argon stream is brought to about 0° C. and fed via manifold 20 to one of the Section I columns (say column 10) which has previously been pressurized to near ambient pressure level. Column 10 is at the time in flow communication with a Section II column (say 15). The nitrogen depleted argon effluent from column 10 is partly fed to column 15 while the remaining part of the effluent is used to pressurize column 11. The purified argon effluent from column 15 is partly withdrawn as product gas through lines 40 and 43, the remaining part of the effluent being sent to storage in vessel 70 via open valve 71, for use in pressuring column 16 during the latter part of the adsorption step, via line 65 and open valve 64.

When the $O_2$ concentration in the argon effluent from column 15 shows a breakthrough of oxygen (say above about 1000 ppm), the crude argon feed is switched to column 11 which is then connected in series to column 16. Columns 10 and 15 are then evacuated in series through open valve 47 in line 46, counter-current to the direction of feed introduction, until the pressure level of column 15 reaches the lowest designed pressure level of the operating cycle, preferably about 100 torr. At this point column 15 is disconnected from column 10, by closing valve 36, and column 15 is pressurized to somewhat above atmospheric pressure, in the order of said about 800 torr, with part of the nitrogen and oxygen-depleted argon stream from storage tank 70. During that time, column 10 is evacuated further to a pressure level of about 100 torr. Then column 10 is pressurized to about 800 torr with a part of the nitrogen-depleted argon stream being produced in column 12. After pressurization to desired level, column 10 is connected with column 16 and a new cycle starting with the adsorption step is begun.

Columns 11 and 12 go through the same sequence of steps as column 10. The Section II columns are connected in the appropriate time and manner. From the foregoing it will be seen that each of the Section II columns undergoes one and a half complete cycles during each complete cycle of the Section I columns. Table 1 describes the role of each column during complete cycles of 60 minutes each.

TABLE 1

| | Column Performance of the VSA Process | | | | |
|---|---|---|---|---|---|
| Time (minutes) | Column 10 | Column 11 | Column 12 | Column 15 | Column 16 |
| 0.0–19.5 | Adsorption | Pressurization | Evacuation | Adsorption | Evacuation |
| 19.5–20.0 | Adsorption | Pressurization | Evacuation | Adsorption | Pressurization |
| 20.0–39.5 | Evacuation | Adsorption | Pressurization | Evacuation | Adsorption |
| 39.5–40.0 | Evacuation | Adsorption | Pressurization | Pressurization | Adsorption |
| 40.0–59.5 | Pressurization | Evacuation | Adsorption | Adsorption | Evacuation |
| 59.5–60.0 | Pressurization | Evacuation | Adsorption | Adsorption | Pressurization |
| 60.0–79.5 | Adsorption | Pressurization | Evacuation | Evacuation | Adsorption |
| 79.5–80.0 | Adsorption | Pressurization | Evacuation | Pressurization | Adsorption |
| 80.0–99.5 | Evacuation | Adsorption | Pressurization | Adsorption | Evacuation |
| 99.5–100.0 | Evacuation | Adsorption | Pressurization | Adsorption | Pressurization |
| 100.0–119.5 | Pressurization | Evacuation | Adsorption | Evacuation | Adsorption |
| 119.5–120.0 | Pressurization | Evacuation | Adsorption | Pressurization | Adsorption |

The illustrated 60 minute cycle is convenient for a system having three Section I columns coupled with two Section II columns. Longer or shorter cycles may be used, adjusted to the number of columns respectively employed in each Section. Table 2 indicates the corresponding valve positions during the cycle in a system such as that illustrated in FIG. 1 of the drawings.

TABLE 2

| Time (minutes) | Valve Position Valve Number | | | | | | | | | | | | | | | | | | | | | |
|---|---|---|---|---|---|---|---|---|---|---|---|---|---|---|---|---|---|---|---|---|---|---|
| | 21 | 22 | 23 | 31 | 32 | 33 | 36 | 37 | 38 | 39 | 47 | 48 | 49 | 51 | 52 | 53 | 56 | 57 | 58 | 63 | 64 | 76 | 77 |
| 0–19.5 | 0 | C | C | 0 | C | C | 0 | C | 0 | C | C | C | 0 | 0 | 0 | C | C | C | 0 | C | C | C | 0 |
| 19.5–20.0 | 0 | C | C | 0 | C | C | 0 | C | 0 | C | C | C | 0 | 0 | 0 | C | C | C | 0 | C | 0 | C | C |
| 20.0–39.5 | C | 0 | C | C | 0 | C | C | 0 | C | 0 | 0 | C | C | C | 0 | 0 | 0 | C | C | C | C | 0 | C |
| 39.5–40.0 | C | 0 | C | C | 0 | C | C | 0 | C | 0 | 0 | C | C | C | 0 | 0 | 0 | C | C | 0 | C | C | C |

TABLE 2-continued

| Time (minutes) | 21 | 22 | 23 | 31 | 32 | 33 | 36 | 37 | 38 | 39 | 47 | 48 | 49 | 51 | 52 | 53 | 56 | 57 | 58 | 63 | 64 | 76 | 77 |
|---|---|---|---|---|---|---|---|---|---|---|---|---|---|---|---|---|---|---|---|---|---|---|---|
| 40.0–59.5 | C | C | O | C | C | O | O | C | O | C | O | C | O | C | O | C | O | C | C | C | C | O | C |
| 59.5–60.0 | C | C | O | C | C | O | O | C | O | C | C | O | C | O | C | O | C | O | C | C | O | C | C |
| 60.0–79.5 | O | C | C | O | C | C | C | O | C | O | C | C | O | O | O | C | C | C | O | C | C | O | C |
| 79.5–80.0 | O | C | C | O | C | C | C | O | C | O | C | C | O | O | O | C | C | C | O | O | C | C | C |
| 80.0–99.5 | C | O | C | C | O | C | O | C | O | C | O | C | C | C | O | O | O | C | C | C | C | C | O |
| 99.5–100.0 | C | O | C | C | O | C | O | C | O | C | O | C | C | C | O | O | O | C | C | C | O | C | C |
| 100.0–119.5 | C | C | O | C | C | O | C | O | C | O | C | O | C | O | C | O | C | O | C | C | C | O | C |
| 119.5–120.0 | C | C | O | C | C | O | C | O | C | O | C | O | C | O | C | O | C | O | C | O | C | C | C |

In the operation as hereinabove described the adsorbent for use for selective removal of nitrogen in the Section I columns may be any of aluminosilicate molecular sieve adsorbents presently employed in the art of nitrogen adsorption from air or from other oxygen-containing gas stream. Among these are the known commercial 5A and 13X molecular sieves.

For selective adsorption of $N_2$ from mixtures with $O_2$ and Ar, the best adsorbents to be used are those having high selectivity for and high capacity for retaining dilute $N_2$ with low heat of adsorption and fast kinetics in the adsorption of $N_2$. Laboratory tests have shown synthetic mordenites, particularly that known commercially as Norton "Zeolon Na", to be superior to other commercial zeolites tested for use in the present invention. Other adsorbents that have been found particularly successful in nitrogen/argon separation are: calcium mordenite and calcium-exchanged 13X zeolite. The preferential adsorption of $N_2$ by such mordenites and other named calcium-exchanged molecular sieves is based on thermodynamic selectivity.

For the Section II columns there can be used any adsorbent which selectively adsorbs $O_2$ from mixtures with argon. Presently, none of the known commercial adsorbents offers thermodynamic selectivity of $O_2$ over Ar. There are carbon molecular sieves (CMS), however, which offer kinetic selectivity for adsorption of $O_2$ from admixture with argon. Such carbon sieves have openings at pore mouths allowing relatively easier access of the smaller $O_2$ molecules into the micropores but restrict movement of the larger argon molecules into the pores. Consequently, an oxygen enriched adsorbed phase can be obtained by contacting the CMS with an oxygen-argon gas mixture if the gas contact time is relatively small. There is no selectivity at true equilibrium. In laboratory tests it was found that available carbon molecular sieves have acceptable capacity and desired selectivity for $O_2$ at near ambient temperatures. The preparation of certain carbon molecular sieves are described by Walker et al: (Second Conference on Industrial Carbon and Graphite, Society of Chemical Industry, London, April 165, pp. 7–12) and by Chichara et al, (Carbon, Vol. 17, pp. 339–343, GB 1979).

The process of the invention can be used to best advantage in the removal of contained minor quantities of oxygen and nitrogen from a gas stream predominating in argon. Such a stream is available, for example, from a cryogenic air separation plant in which a crude argon fraction is separately recovered. A typical crude argon stream for which the process of the invention is particularly applicable may contain 2–10% $O_2$ and up to about 5% or so of nitrogen. By passing such crude argon stream serially through the Section I and Section II adsorptive columns as hereinbefore described, practically all of the nitrogen is removed (to ~3 ppm) and most of the oxygen, down to a level of about 1000 ppm. If further removal of oxygen is desired, the argon effluent recovered from the Section II column (line 43) may be subjected to catalytic hydrogenation in any known system, wherein residual oxygen is removed by conversion to water.

A complete plant layout incorporating the adsorption system (FIG. 1) in association with the source of the crude argon stream and the catalytic hydrogenation section is illustrated in FIG. 2. The parts of the vacuum swing adsorption (VSA) system bear the same reference characters as in FIG. 1. The overall system employed to best advantage in the practice of the invention comprises in fluid flow inter-relation the cryogenic crude argon column 98 associated with a cryogenic air separation unit, the VSA system of FIG. 1, designated 99, and the catalytic hydrogenation system 100.

Referring now more particularly to FIG. 2, the argon stream obtained from the crude argon column 98 associated with a cryogenic air separation unit, is warmed and passed into the manifold 20 connecting with each of the Section I adsorption columns 10, 11, 12 of FIG. 1. The treated argon stream leaving the Section II columns via line 43, now substantially freed of nitrogen and containing only a very small amount of residual oxygen, is compressed at 101 (FIG. 2) to about 3 to 8 atmospheres and sent by line 102 to the catalytic hydrogenation reactor system 100, in which the gas stream 43 is subjected to known treatment with hydrogen gas in the presence of suitable catalyst under conditions effecting hydrogen-oxygen combination to form water. The thus purified argon stream recovered from system 100 will contain generally less than 50 ppm oxygen and preferably no more than about 5 ppm.

The evacuated waste gas from the VSA unit 99 comprises oxygen, nitrogen and argon. This gas stream, withdrawn via line 46, is compressed and cooled to cryogenic temperature, and sent back to the main air separation unit for increasing the overall recovery of argon.

What is claimed:

1. The method of purifying a crude argon stream containing minor amounts of oxygen and nitrogen which comprises the steps of:
   (a) during an adsorption step passing said stream as feed serially through a first bed of adsorbent preferentially selective in retention of nitrogen and during said adsorption step passing substantially the entire unadsorbed gaseous effluent from said first bed directly into and through a physically separated second adsorbent bed kinetically selective in adsorption of oxygen, while recovering from said second bed the discharged argon product stream of enhanced purity; then regenerating both said beds by;
(b) simultaneously evacuating said first and second bed in a direction counter to step (a); then
(c) while continuing said evacuation of said first bed only, repressuring said second bed in a direction counter to that of the feed with a portion of the purified argon product recovered in step (a); then
(d) repressuring said first bed with purified nitrogen-depleted argon product from a companion first bed; then
(e) again subjecting the first bed to step (a);

the foregoing steps being carried out in preset time sequence in a system comprising a plurality of such first beds operated cyclically in parallel and a lesser plurality of such second beds operated in parallel, so arranged that the said second beds undergo in sequence, the steps of (a) receiving crude argon, (b) evacuation and (c) repressuring, a larger number of cycles during a given time period than said associated first beds.

2. The method as defined in claim 1 wherein said method is carried out in a system comprising three such first bed operated in parallel and two such second beds operated in parallel.

3. The method as defined in claim 1 wherein said first bed contains aluminosilicate zeolite and said second bed contains carbon molecular sieve.

4. The method as defined in claim 1 wherein said crude argon feed stream contains about 2–10% oxygen and up to about 5% nitrogen.

5. The method as defined in claims 1 or 2 wherein step (a) is continued for a preset time period such that there is a breakthrough from said first bed of product containing about 3 ppm nitrogen.

6. The method as defined in claim 1 wherein step (a) is continued for a preset time period such that there is a breakthrough from said second bed of an argon product stream containing at maximum about 1000 ppm oxygen.

7. The method as defined in claim 6 wherein said argon product stream is subjected to further purification to reduce its oxygen content to less than 50 ppm.

8. The method as defined in claim 6 wherein said argon product stream is subjected to further purification to reduce its oxygen content to a level not in excess of about 5 ppm.

9. The method as defined in claim 1 wherein the defined steps of the recited cycle are carried out adiabatically around a base temperature of about $-20+$ to $+30°$ C. and over a pressure swing range of about an atmosphere.

10. The method as defined in claim 1 wherein step (a) is carried out over a pressure range of about 0 to 20 psig and during step (b) said pressure is reduced to a level of about 20 to 300 torrs in said second bed.

11. The method as defined in claim 1 wherein during said step (c) the first bed is evacuated to a level of about 20 to 300 torrs.

12. The method as defined in claim 1 wherein the time cycle is so arranged that each such second bed undergoes one and a half complete cycles during each complete cycle of a first bed.

13. The method as defined in claim 1 wherein said crude argon stream is one obtained from air by cryogenic separation and wherein at least part of the evacuated gas from steps (b) and (c) is recycled to said cryogenic air separation.

14. The method as defined in claim 1 wherein the argon product stream recovered in step (a) is subjected to further purification through catalytic hydrogenation of residual oxygen therein.

* * * * *